(No Model.)

J. R. BARKER.
BICYCLE TOOL.

No. 592,859.   Patented Nov. 2, 1897.

WITNESSES
Jos. Gregory
J. E. Tappen

INVENTOR
John R. Barker,
by John Wedderburn
Attorney

UNITED STATES PATENT OFFICE.

JOHN R. BARKER, OF JACKSONVILLE, FLORIDA, ASSIGNOR OF ONE-HALF TO CHARLES S. ADAMS, OF SAME PLACE.

BICYCLE-TOOL.

SPECIFICATION forming part of Letters Patent No. 592,859, dated November 2, 1897.

Application filed October 15, 1896. Serial No. 608,984. (No model.)

*To all whom it may concern:*

Be it known that I, JOHN R. BARKER, a citizen of the United States, residing at Jacksonville, in the county of Duval and State of Florida, have invented certain new and useful Improvements in Bicycle-Tools; and I do hereby declare the following to be a full, clear, and exact description of the invention, such as will enable others skilled in the art to which it appertains to make and use the same.

This invention has reference to a novel construction in a device adapted for use in straightening out indentations in tubing, and is adapted more especially for straightening out dents in the tubing in the frames of bicycles and the like.

The invention consists in the features of construction as hereinafter described and claimed.

Figure 1:
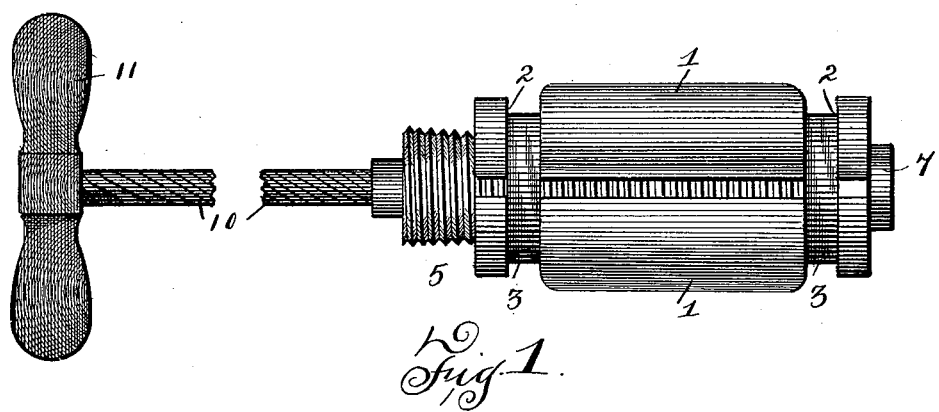
Figure 2:
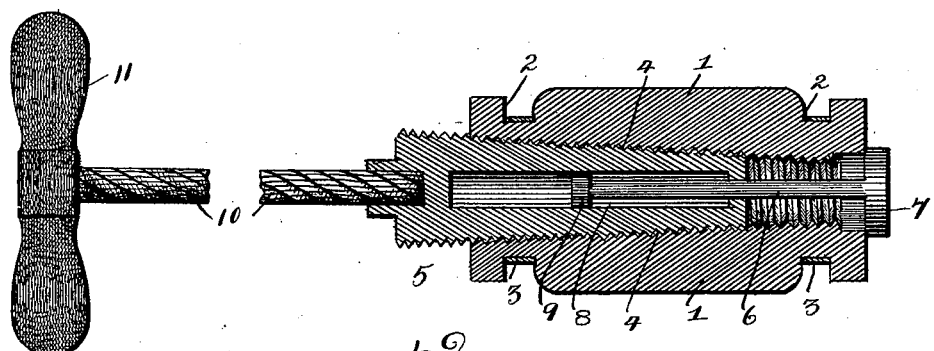

In the accompanying drawings, illustrating this invention, Figure 1 is a side elevation of my invention, and Fig. 2 is a longitudinal section.

Referring now to said drawings, 1 indicates an expansible plug, consisting of four sections having annular grooves 2 at the ends thereof to receive springs 3, by means of which they are held together, but allowed to expand. The said plug is provided with a conical aperture 4, that is screw-threaded and receives a conical expanding-nut 5, screw-threaded to engage the screw-threads of the said plug. To the small end of the nut 5 is secured a pin 6, that extends beyond the end of the plug 1, and is provided with a head 7, that serves to prevent the plug from falling from the nut when the nut is unscrewed and does not engage the screw-threads of the plug. The said pin 6 preferably extends into an opening 8 in said nut, which has a small headed end 9 therein.

To the large end of the plug is attached a flexible rod or cable 10, having a handle 11, that serves not only to turn the nut, but which will allow the instrument to be worked within bent or curved tubing, such as a handle-bar, for instance.

The manner in which this tube is used is as follows: The plug is inserted in a contracted position until it stands about opposite the dent and wedges slightly therein, whereupon by turning the rod or cable 10 the nut 5 enters the conical opening in the plug and thereby expands the same, so that the dent is pressed out in an obvious manner.

A tool of this construction is simple and inexpensive and will effectually remove dents in the manner set forth.

Having thus described my invention, what I claim as new, and desire to secure by Letters Patent, is—

1. The combination with an expansible plug consisting of a plurality of longitudinal sections forming in conjunction with each other a cylindrical body, a conical screw-threaded opening through said plug, and a spring for holding said sections of the plug normally in contact with each other to form a cylindrical body, of a conical screw-threaded nut situated within said plug and provided with a flexible connecting-piece and a handle.

2. The combination with an expansible plug consisting of sections having grooves near the ends thereof, springs within said grooves, a conical screw-threaded opening in said plug, of an expanding-nut situated within said plug and having a headed pin secured to one end thereof, and a connecting-piece secured to the other end thereof and provided with a handle, substantially as described.

In testimony whereof I have signed this specification in the presence of two subscribing witnesses.

JOHN R. BARKER.

Witnesses:
E. J. L'ENGLE,
A. BUTTLE HUMPHREYS.